R. V. PEARSON.
CONNECTING ROD.
APPLICATION FILED JAN. 20, 1920.
1,359,737.
Patented Nov. 23, 1920.
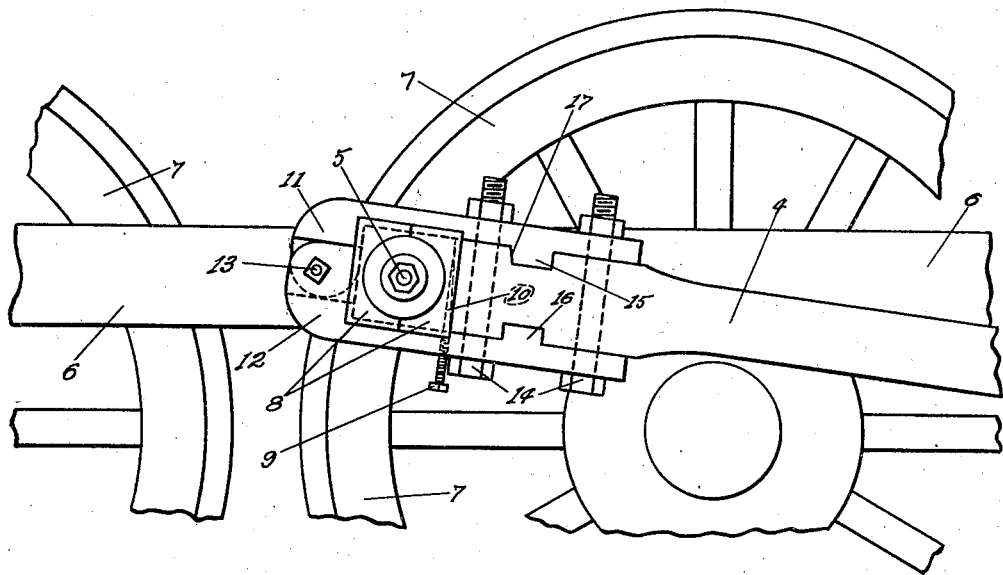
Fig_1_
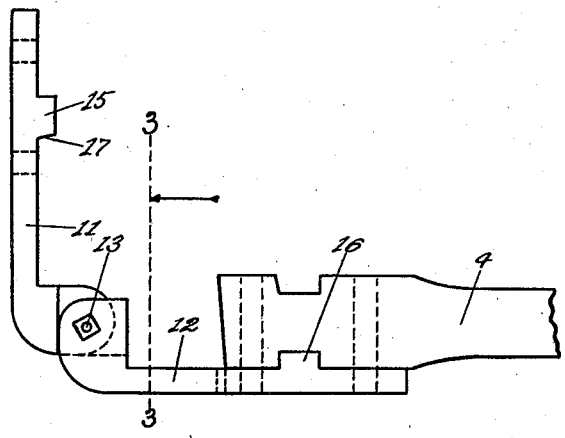
Fig_2_
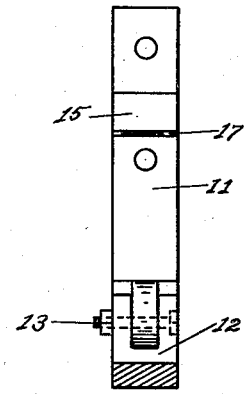
Fig_3_
INVENTOR
RAYMOND V. PEARSON
BY HIS ATTORNEY
A. E. Carlson

UNITED STATES PATENT OFFICE.

RAYMOND V. PEARSON, OF MINNEAPOLIS, MINNESOTA, ASSIGNOR OF ONE-HALF TO THEOPHILL GONIER, OF MINNEAPOLIS, MINNESOTA.

CONNECTING-ROD.

1,359,737.  Specification of Letters Patent.  Patented Nov. 23, 1920.

Application filed January 20, 1920. Serial No. 352,859.

*To all whom it may concern:*

Be it known that I, RAYMOND V. PEARSON, a citizen of the United States, residing at Minneapolis, in the county of Hennepin and State of Minnesota, have invented certain new and useful Improvements in Connecting-Rods, of which the following is a specification.

My invention relates to improvements in connecting rods for engines and is designed especially for use on steam driven locomotives. The invention is clearly illustrated in the accompanying drawing, in which:

Figure 1 is a detail portion of parts of a locomotive showing the application of my invention.

Fig. 2 is an end view of the improved connecting rod shown in Fig. 1 and showing one of the retaining or clamping members in open position.

Fig. 3 is a sectional view as seen on the line 3—3 in Fig. 2.

Referring to the drawing by reference numerals, 4 designates a connecting rod adapted to be connected at one end to the cross head of a piston rod (not shown) and is adapted at its other end to be rotatably connected to a journal member or stud 5 secured to the horizontal drive rod 6 which is connected to the drive wheels 7 on one side of the engine. The stud 5 is generally journaled in the end of the connecting rod 4 in two bearing members 8, and as this point is one of great strain, when the locomotive is being driven, there is considerable wear in said bearing members, a part of which can be compensated by the key screw 9 which when tightened will force a wedge shaped key 10 up and close the bearing members 8 together. However, it is frequently found necessary to remove the members 8 altogether for adjustment and repairing purposes, and this with the old forms of connecting rods has been found hard and tedious work. With my invention however this operation becomes a quick and easy task.

In the end portion of the connecting rod 4 I provide two substantially vertical bolt holes and a transverse notch or channel on each of the upper and lower edges. I hold and secure the bearing members 8 to the end of the connecting rod by means of two clamping members 11 and 12, pivotally connected to each other at 13 at one end and adapted to be secured to the connecting rod 4 at the other end by means of bolts 14. Integral with the inner sides of each of the clamping members 11 and 12 I provide transverse projections or shoulders 15 and 16 which are adapted to fit in the notches in the connecting rod. The projection 16 preferably has a driving fit in its notch, but the projection 15 it will be noticed has an inclined face 17 and a correspondingly inclined adjacent face is provided in its notch in the connecting rod. With this construction it is obvious that when the bearing members 8 are to be removed it is only necessary to remove the bolts 14 when the clamping member 11 can be swung back, as in Fig. 2; and replacing of the members is as easily accomplished by a reverse operation. The possibility of shearing the bolts 14, an objection to some former designs as the push and pull of the connecting rod was directly on them, is overcome by reason of the projections 15 and 16 in their notches or channels, the bolts serving mainly for the purpose of holding the members 11 and 12 tightly to the connecting rod.

Having now fully shown and described my invention, what I claim to be new and desire to protect my Letters Patent is:

A device of the class described consisting of the end portion of a connecting rod the same having upper and lower transverse channels therein, clamping members adapted to secure bearings to the end of said connecting rod, said members being hingedly secured together at one end and adapted to be detachably secured at their opposite ends to said connecting rod, transverse projections integral with said clamping members adapted to engage said channels, tightly fitted bolts extending through and adapted to secure said clamping members to the connecting rod.

In testimony whereof I affix my signature.

RAYMOND V. PEARSON.